2 Sheets--Sheet 1.

U. T. STEWART.
Seed-Planter.

No. 161,292. Patented March 23, 1875.

WITNESSES
Wm Beale Hale
Philip W. Hale

INVENTOR
Uriah T. Stewart,
per George W. Richards
ATTORNEY

THE GRAPHIC CO.PHOTO-LITH.39 & 41 PARK PLACE,N.Y.

U. T. STEWART.
Seed-Planter.

No. 161,292.

2 Sheets--Sheet 2.

Patented March 23, 1875.

WITNESSES
W. Beale Hale
Philip W. Hale.

INVENTOR
Uriah T. Stewart,
per George W. Richards
ATTORNEY

THE GRAPHIC CO.PHOTO-LITH.39 & 41 PARK PLACE, N.Y.

UNITED STATES PATENT OFFICE.

URIAH T. STEWART, OF ROSSVILLE, TENNESSEE.

IMPROVEMENT IN SEED-PLANTERS.

Specification forming part of Letters Patent No. 161,292, dated March 23, 1875; application filed February 4, 1875.

*To all whom it may concern:*

Be it known that I, URIAH T. STEWART, of Rossville, in the county of Fayette and State of Tennessee, have invented certain new and useful Improvements in Planters; and I do hereby declare that the following is a full, clear, and exact description thereof, which will enable others skilled in the art to which it pertains to make and use the same, reference being had to the accompanying drawings, and to the letters of reference marked thereon, which form a part of this specification.

My invention consists in the combination and arrangement, in a single machine, of devices for planting corn, pease, and cotton-seed and dropping manure at the same time, or which can be used for planting either corn, pease, or cotton-seed separately, or with manure, or two kinds of grain or seed together.

Figure 1:
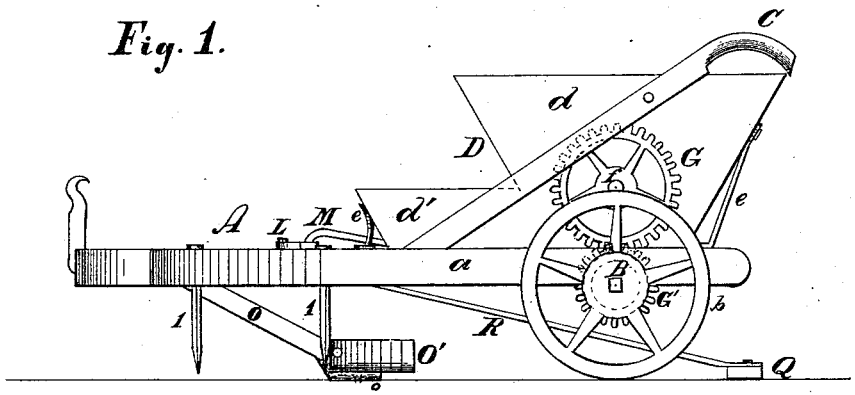
Figure 2:
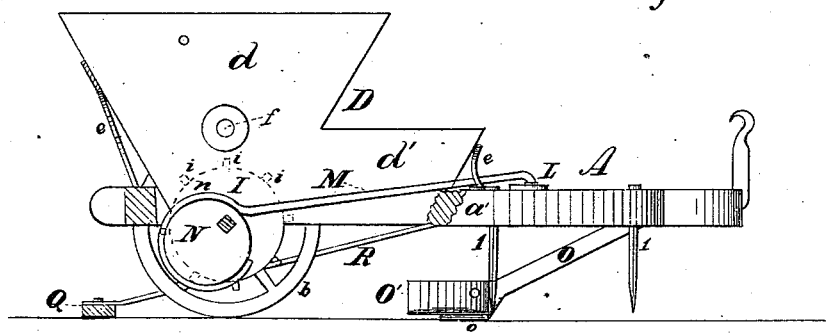
Figure 3:
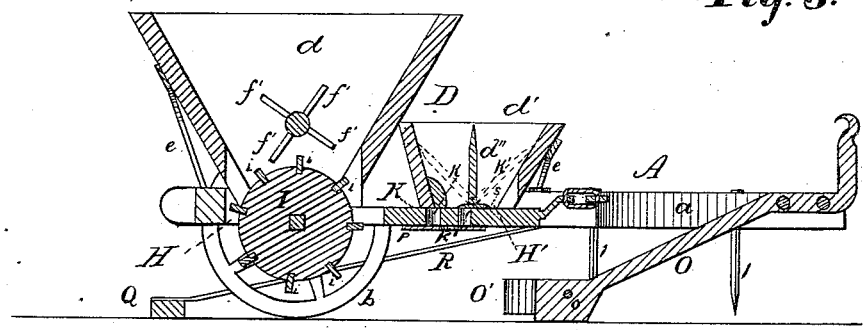
Figure 4:
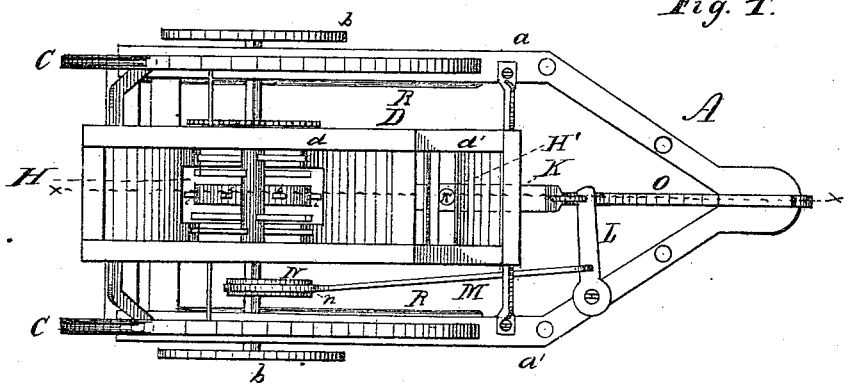

In the drawing, Figure 1 is a side elevation of my invention; and Fig. 2 is an elevation of the opposite side, having a portion of the frame broken away in order to show certain parts, which will be hereafter referred to. Fig. 3 is a vertical section taken on the line $x\ x$ in Fig. 4, which is a plan view. Fig. 4 is a plan, and Fig. 5 a perspective, view of the opener.

Figure 5:
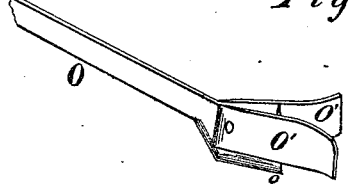

A is the frame, the side timbers $a\ a'$ of which rest upon the axle B of wheels $b\ b$, and are provided with suitable bearings or boxes for said axle. The front part of frame A is pointed or V-shaped, and provided with downward-projecting harrow-teeth 1 1. C C are handles, by which the planter is guided. D is a double hopper, supported between the side timbers of the frame A by means of supports $e\ e$, so that the lower edge of said double hopper extends only slightly below the side timbers. The double hopper is composed of two chambers, $d\ d'$, the forward and smaller chamber $d'$ being provided with a swinging partition, $d''$. Transversely through the larger chamber $d$ is arranged a shaft, $f$, provided with radial arms $f'\ f'$, and having bearings in the side walls of the chamber. Upon one end of said shaft, which projects through the wall of the hopper, is mounted a gear-wheel, G, which meshes with a smaller gear-wheel, G', which is mounted upon the axle B, receiving motion therefrom, which is communicated to wheel G, causing shaft $f$ to turn and revolve the agitator-arms $f'\ f'$ inside the chamber $d$ when the machine is in use. In the bottom of chamber $d$ is a longitudinal opening, H, up through which extends and plays a seed-delivering wheel, I, mounted upon the middle of axle B. This wheel I is provided upon its periphery with spurs or short arms $i\ i\ i\ i$. In the bottom of the smaller chamber $d'$ is also a longitudinal opening, H', in which works a slide, K, provided with apertures or seed-holes $k\ k'$. This slide K is supported in its race by a plate, $p$, extending under it, and secured to the under side of the hopper. The plate $p$ is provided with an opening, $k''$. The forward end of slide K extends beyond the front of the hopper, and is attached, by a link, to the end of a lever, L, the other end of which is pivoted upon the side timber $a'$ of frame A. About the middle of lever L is pivoted or otherwise flexibly attached the end of a rod, M, which extends rearward, and terminates in a strap, $n$, which surrounds an eccentric, N, mounted upon axle B. Across the opening H' in the bottom of front chamber $d'$ is arranged a knife-edged metal bar, $s$. If a grain of corn or a pea should be caught between the edge of aperture $k$ or $k'$ and this knife-edge, said grain or pea would be easily cut, and not hinder the working of slide K. From the front of frame A a beam, O, extends rearward and downward to the ground, terminating under the front part of chamber $d'$ in an opener, a perspective view of which is shown in Fig. 5. This opener consists of a central cutter, $o$, formed on bar O, and the flaring side pieces O' O', and its action in opening a furrow is obvious. I usually make the beam O and the opener of iron. Somewhat forward of the wheels $b\ b$ rods R R are pivoted to the inner sides of the timbers $a\ a'$, and extend backward behind the wheels, and are, respectively, attached to a transverse bar, Q, which drags upon the ground, and has its front side arched and beveled to act as a coverer.

The operation of my invention is as follows: When it is desired to plant cotton-seed, corn, and pease at the same time, and also to drop manure with the seed, the manure and cotton-seed are placed together in chamber $d$, and corn and pease in chamber $d'$, the two being separated by the hinged partition $d''$. When the horses, which are hitched to the front of the frame, are started, the harrow-teeth level the ground, the opener opens a furrow, and the turning of eccentric N causes rod M to communicate a vibratory motion to lever L, which moves slide K back and forth in the opening or race H' in bottom of chamber d'. In the passage of slide K corn and pease fall into the openings k k' in said slide, and are drawn one to the hole k'' in the plate p, and the other beyond the edge of the plate, and drop into the furrow. The turning of axle B causes wheel I to rotate, and its spurs i i i i pull the cotton-seed and manure down through the opening in the bottom of chamber d, whence the mixed cotton-seed and manure drop into the furrow, and the whole is covered by the bar Q dragging behind, the front edge of said bar being so shaped as to brush the earth inward. The turning of axle B also communicates motion, through the gear-wheels G G', to the shaft f, the arms f' f' of which keep the cotton-seed stirred up, and prevent it from becoming packed in the hopper.

It is obvious, without further explanation, that the several kinds of seed may be planted either separately or together.

When only one kind of seed is to be dropped from the front chamber d', the hinged partition may be turned to one side, in order to allow room for a larger quantity.

Having now fully described the construction and operation of my invention, I claim and wish to secure by Letters Patent—

In a seed-planter, the double hopper D, consisting of rear chamber d and front chamber d', provided with pivoted partition d'', in combination with seed-delivering wheel I and dropping-slide K, having apertures k k', substantially as described.

In testimony that I claim the foregoing as my own invention I affix hereto my signature in the presence of two witnesses.

URIAH T. STEWART.

Witnesses:
  JAMES M. LIDDELL,
  WILLIAM H. GWYN.